United States Patent
Brancaleone et al.

(10) Patent No.: US 7,325,859 B1
(45) Date of Patent: Feb. 5, 2008

(54) DOOR SASH HEADER FOR AUTOMOTIVE VEHICLE

(75) Inventors: Robert Brancaleone, Farmington Hills, MI (US); Ronald Machin, Ann Arbor, MI (US); Greg Dobieralski, Plymouth, MI (US); Michael Kozak, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 262 days.

(21) Appl. No.: 11/163,621

(22) Filed: Oct. 25, 2005

(51) Int. Cl.
*B60J 5/04* (2006.01)

(52) U.S. Cl. .................. 296/146.9; 49/484.1; 49/489.1

(58) Field of Classification Search ............. 296/146.9, 296/146.2; 49/484.1, 498.1, 489.1
See application file for complete search history.

(56) References Cited

U.S. PATENT DOCUMENTS 6,131,342 A * 10/2000 Miyamoto et al. ......... 49/484.1
6,641,204 B2    11/2003 Ogawa et al.

* cited by examiner

*Primary Examiner*—Joseph D. Pape
(74) *Attorney, Agent, or Firm*—Gigette M. Bejin; Dickinson Wright PLLC

(57) ABSTRACT

A door sash header for an automotive vehicle includes a glazing seal retainer, an external trim retention portion, and a multi-channel weatherstrip retention structure which utilizes upwardly and downwardly opening channels cooperating with the door sash to retain a weatherstrip upon the header without the need for additional fastening devices such as mechanical fasteners or adhesives.

13 Claims, 3 Drawing Sheets

DOOR SASH HEADER FOR AUTOMOTIVE VEHICLE

TECHNICAL FIELD

The present application relates to a door construction for an automotive vehicle.

BACKGROUND

In general, the sash header of an automotive door is required to serve several utilities. These include: retaining external trim at the uppermost part of the vehicle door; retaining internal trim at an upper part of the door; providing a means for attaching a glazing seal to an upper part of the door; and providing attachment and a support mechanism for the primary weatherstrip of the door. Of course, with high volume automotive vehicles it is desirable to perform these functions using the least amount of material, the least assembly time, the lowest cost, and the lowest possible complexity. U.S. Pat. No. 6,641,204 discloses a molding attachment structure for an automotive door which provides at least some of the functions listed above, but with anticipated increased cost and complexity due to the need for push through fasteners to contain a primary weatherstrip to the header. In addition to increasing complexity and cost, such fasteners also provide additional paths for corrosion.

The present door sash header overcomes problems noted with components found in the prior art by providing a unitary roll-formed header not needing any fasteners for the installation of either the header or the components, such as a primary weatherstrip attached to the header.

SUMMARY

A door sash header for an automotive vehicle includes a partially cup-shaped glazing seal retainer having a base portion attached to an inner door panel, and an external trim retention portion comprising a wall section overlaid in part on an external wall of the glazing seal retainer. A multi-channel, primary weatherstrip retention structure extends generally inboard of the external trim retention portion and defines an outboard, upwardly opening channel for retaining an external trim, and an inboard, downwardly opening channel. The upwardly opening channel has a base which cooperates with the downwardly opening channel to retain a weatherstrip upon the sash header. In a preferred embodiment, the glazing seal retainer portion of the sash header is welded to the sash or inner door panel. The external trim retention portion extends generally upwardly from the glazing seal retainer. The weatherstrip retention structure further cooperates with a portion of the sash welded to the base portion of the cup-shaped glazing seal retainer to retain the primary weatherstrip upon the door sash header.

It is an advantage of the present invention that the present door sash header allows the mounting of not only external trim, but also a glazing seal and a primary weatherstrip, all without the need for any separate fasteners.

It is a further advantage of the present invention that the present door sash header provides superior support for a door primary weatherstrip so as to reduce the likelihood of wind and/or water leakage into the passenger compartment of a vehicle.

Other advantages, features, and objects of the present invention will become apparent to the reader of this specification.

DETAILED DESCRIPTION OF THE PREFERRED EMBODIMENTS

Figure 1:
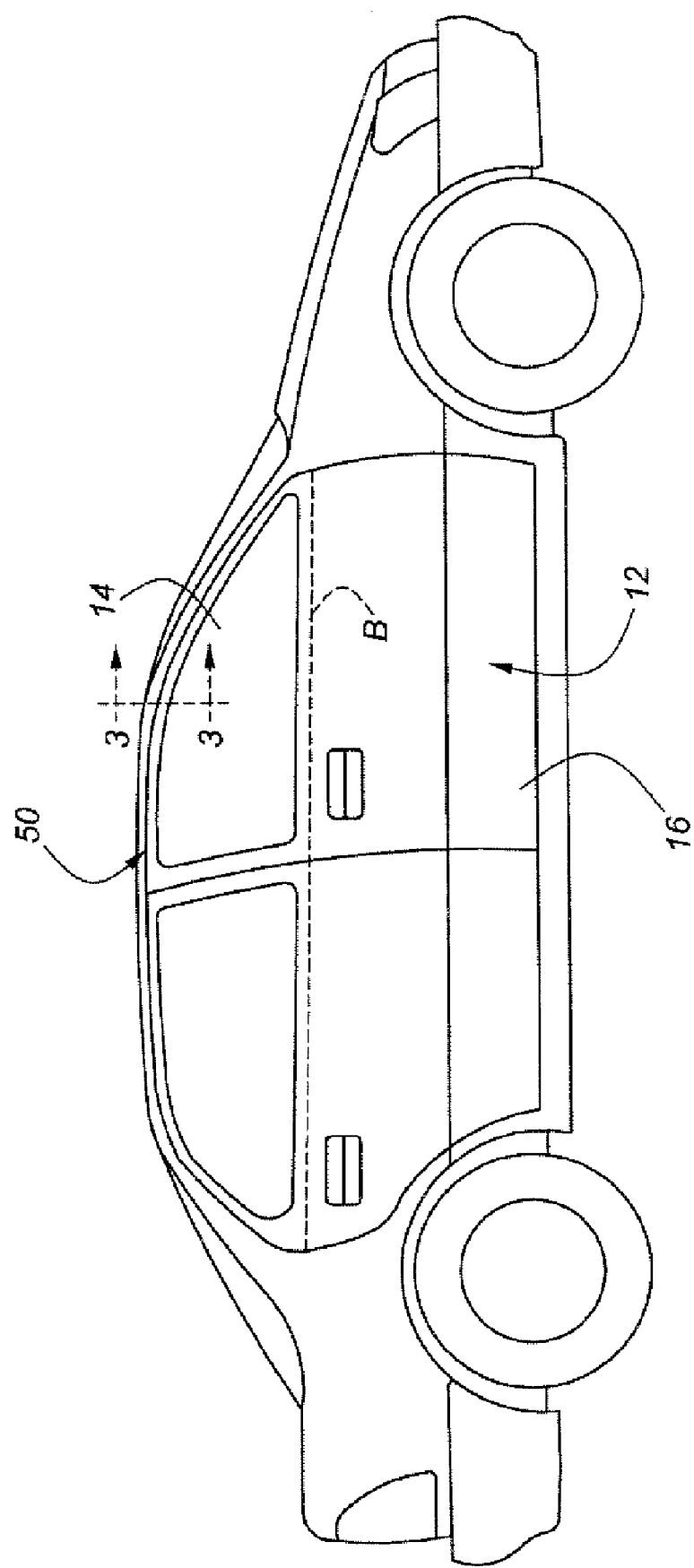
FIG. 1 is a side view of a vehicle having a door sash header according to the present invention.

As shown in FIG. 1, vehicle 10 has door 12, with glazing 14 installed therein. Door 12 includes outer panel 16 and sash header 50. In essence, the term "sash" refers to section 24 of door 12 above the beltline, (labeled "B"), in FIG. 1.

Figure 2:
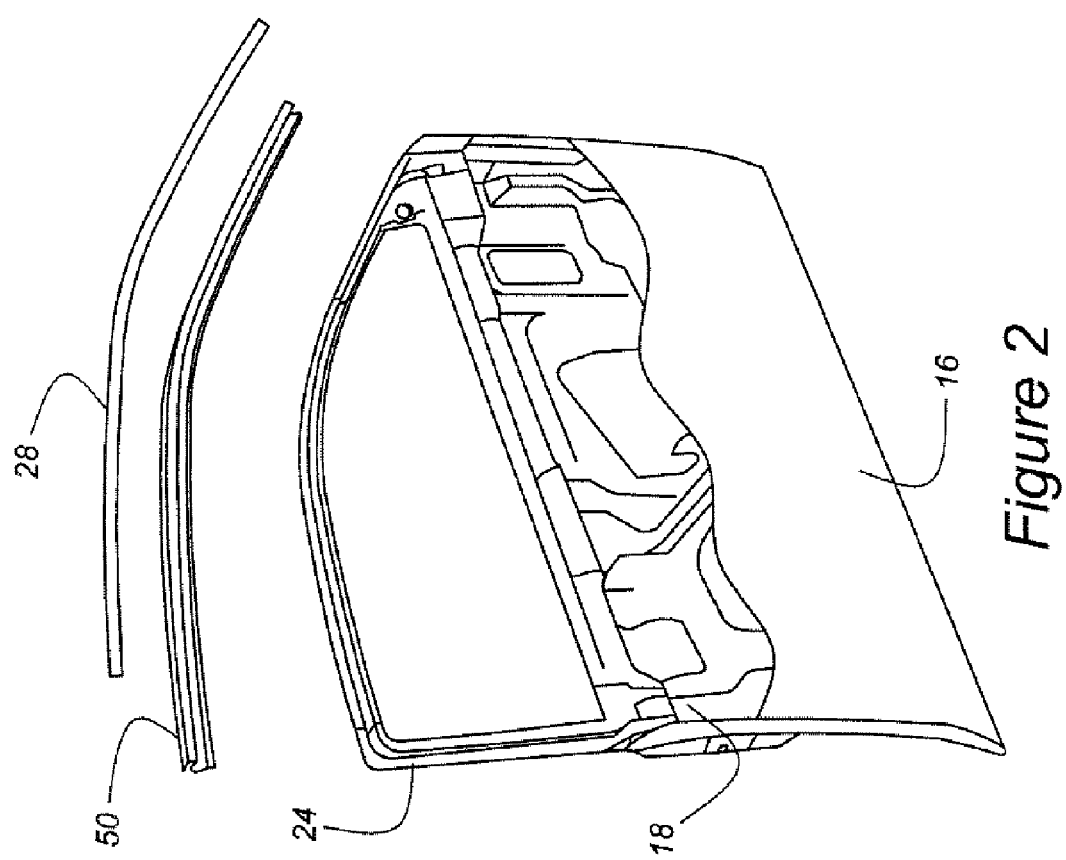
FIG. 2 is a partially exploded perspective view of a door having a sash header according to the present invention.
Figure 3:
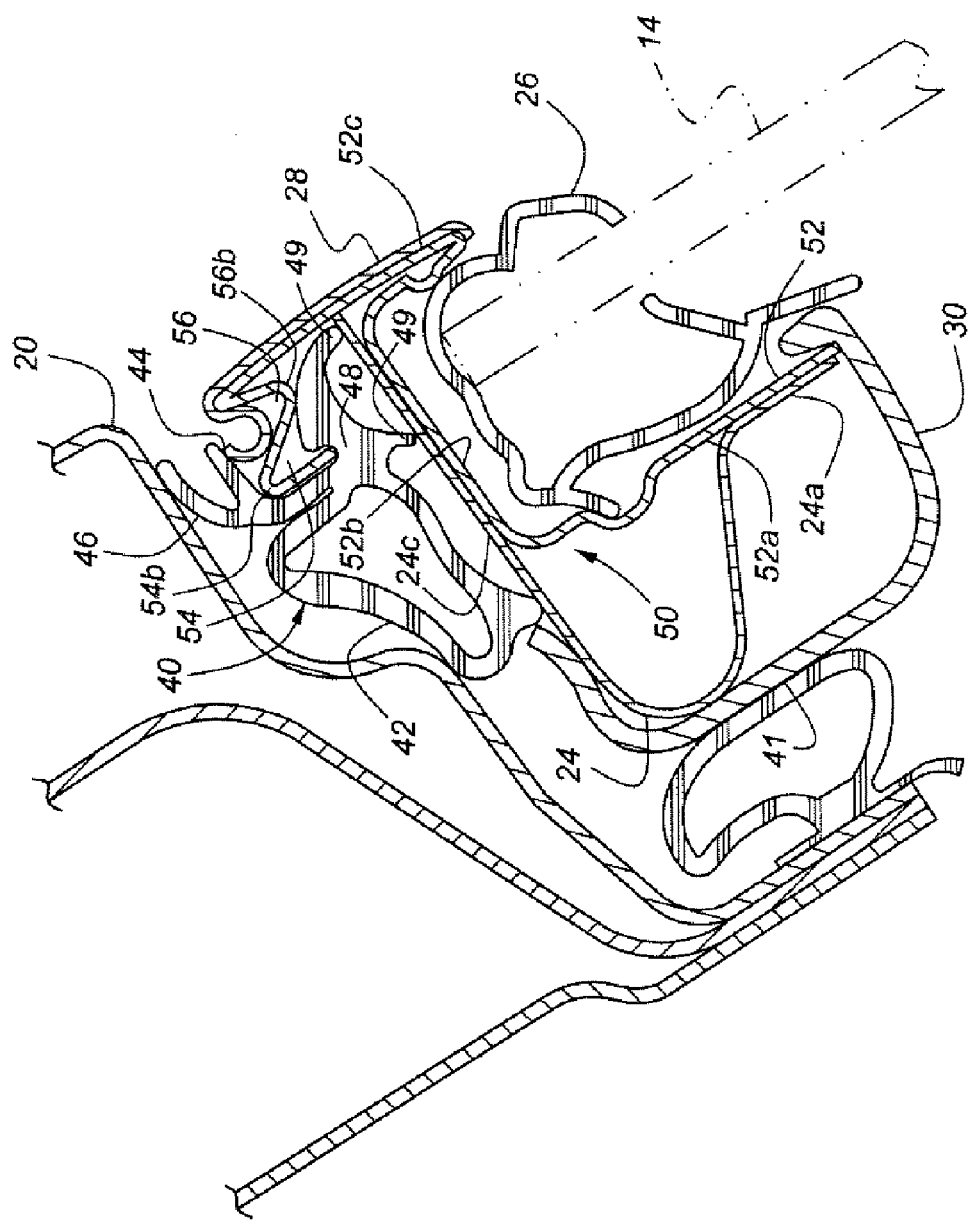
FIG. 3 is a sectional view of a portion of a door having a sash header as shown in FIGS. 1 and 2, taken along the line 3-3 of FIG. 1.

FIG. 2 shows door 12 as having outer panel 16, which is applied over inner panel 18. Sash 24 is a unitary part of inner door panel 18, and may be either welded to panel 18 or integral with panel 18. Sash header 50 is shown in its exploded position but is assembled as shown in FIG. 3. Finally, external trim molding 28 is shown in FIG. 2, also in an exploded position.

Turning now to FIG. 3, glazing 14 is shown as being engaged with glazing seal 26, which is housed within and retained to sash header 50 by means of glazing seal retainer 52, which is a first integral part of sash header 50. Glazing seal retainer 52 is partially cup-shaped and begins with portions 52a and 52b, which are welded to sash 24 at mutually perpendicular locations 24a and 24c, respectively.

Sash header 50 further includes external trim retention portion 52c, which in addition to providing a clip-on surface for attaching external trim 28, also functions as the third part of cup-shaped glazing seal retainer 52. Trim retention portion 52c extends generally upwardly, and is formed as a wall section overlaid and conjoined with the remaining portion of glazing seal retainer 52.

The upper portion of external trim 28 hooks into upwardly opening channel 56, which is located outboard from downwardly opening channel 54. Both of channels 54 and 56, as well as portions 52a, 52b, and 52c of sash header 50 are unitary and part of a single roll-formed construction. In essence, downwardly opening channel 54 and upwardly opening channel 56, taken together, function as a multi-channel weatherstrip retention structure.

Weatherstrip 40 preferably functions as a primary weatherstrip. Secondary weatherstrip 41, having a closed bulb configuration, is attached to door opening panel 20 of vehicle 10. Primary weatherstrip 40 includes bulb 42 and margin lip seal 46, which is supported by lip seal base 44. Note that lip seal base 44 is supported not only by the weatherstrip retention structure, which in the illustrated case is the base, 54b, of downwardly opening channel 54, but also by external trim 28.

Primary weatherstrip 40 has a base 48, incorporating support fingers 49, which are in contact with portion 24c of sash 24. In essence, downwardly opening channel 54 and upwardly opening channel 56, and more particularly, base portion 56b of upwardly opening channel 56, cooperate with the portion, 24c, of sash 24 overlaid upon glazing seal retainer 52 to retain primary weatherstrip 40 upon sash header 50. Because neither discrete mechanical fasteners, nor adhesives, are needed for retaining weatherstrip 40 upon door 12, cost, complexity, and assembly time are all reduced.

The present sash header also provides support and a mounting location for internal trim 30, which is applied to sash 24 and to portion 52*a* of glazing seal retainer 52. Trim 30 bears upon secondary weatherstrip 41, which, as noted above, is carried upon door opening panel 20.

While particular embodiments of the invention have been shown and described, numerous variations and alternate embodiments will occur to those skilled in the art. Accordingly, it is intended that the invention be limited only in terms of the appended claims.

What is claimed is:

1. A door sash header for an automotive vehicle, comprising:
   a partially cup-shaped glazing seal retainer having a base portion attached to a sash portion of an inner door panel;
   an external trim retention portion comprising a wall section overlaid in part upon an external wall of said glazing seal retainer; and
   a multi-channel, weatherstrip retention structure extending generally inboard of said external trim retention portion and defining an outboard, upwardly opening channel for retaining an external trim, and an inboard, downwardly opening channel, with said upwardly opening channel having a base cooperating with said downwardly opening channel to retain a weatherstrip upon the sash header.

2. A door sash header according to claim 1, wherein said glazing seal retainer is welded to said inner door panel.

3. A door sash header according to claim 1, wherein said external trim retention portion extends generally upwardly from said glazing seal retainer.

4. A door sash header according to claim 1, wherein said weatherstrip retention structure further cooperates with the portion of the inner door panel welded to the base portion of said cup-shaped glazing seal retainer to retain said weatherstrip upon said door sash header.

5. A door sash header according to claim 1, wherein said header is produced by a roll forming process.

6. A unitary door sash header for an automotive vehicle, comprising:
   a partially cup-shaped glazing seal retainer having a base portion overlaid by and welded to a door sash;
   an external trim retention portion comprising a wall section overlaid in part upon an external wall of said glazing seal retainer and extending generally upwardly therefrom; and
   a multi-channel weatherstrip retention structure extending generally inboard of said external trim retention portion and having an inboard, downwardly opening channel and an outboard, upwardly opening channel for retaining an external trim, with said upwardly opening channel having a base portion cooperating with said downwardly opening channel and with the portion of the door sash overlaid upon the glazing seal retainer to retain a weatherstrip upon said header and said sash.

7. A door sash header according to claim 6, wherein said header is produced by a roll forming process.

8. A door for an automotive vehicle, comprising:
   an inner panel having a base portion and a sash portion extending upwardly from the base portion;
   an outer panel connected to said inner panel;
   a glazing panel located for slidable movement from an open position to a closed position;
   a one-piece sash header attached to an upper portion of said sash portion of said inner panel, with said sash header comprising:
      a partially cup-shaped glazing seal retainer having a base portion overlaid by and welded to said inner door panel;
      an external trim retention portion comprising a wall section overlaid in part upon an external wall of said glazing seal retainer and extending generally upwardly therefrom;
      a multi-channel weatherstrip retention structure extending generally inboard of said external trim retention portion and having an inboard, downwardly opening channel and an adjacent, outboard, upwardly opening channel for retaining an external trim, with said upwardly opening channel having a base portion cooperating with said downwardly opening channel and with the portion of the inner door panel overlaid upon the glazing seal retainer to retain a weatherstrip upon said header; and
   a weatherstrip attached to said multi-channel weatherstrip retention structure.

9. An automotive door according to claim 8, wherein said sash header is unitary and produced in a roll forming process.

10. An automotive door according to claim 8, further comprising an internal trim molding attached to said inner door panel and to said multi-channel weatherstrip retention structure, with said trim molding being positioned so as to seal upon a secondary weatherstrip carried upon a door opening panel.

11. An automotive door according to claim 8, further comprising an external trim molding attached to said external trim retention portion of said sash header, so as to support a portion of said weatherstrip.

12. An automotive door according to claim 11, wherein said weatherstrip comprises a bulb section for contacting a door opening panel and a margin lip seal having a base connected to the bulb and supported by both of said weatherstrip retention structure and by said external trim molding, and with said margin lip seal further comprising a sealing lip cantilevered from said base.

13. An automotive door according to claim 8, further comprising a glazing seal mounted within said glazing seal retainer.

* * * * *